Aug. 2, 1938.   F. P. KRETCHMER   2,125,729
MACHINE FOR MAKING FILLED CONFECTIONS
Filed April 30, 1936   2 Sheets-Sheet 1
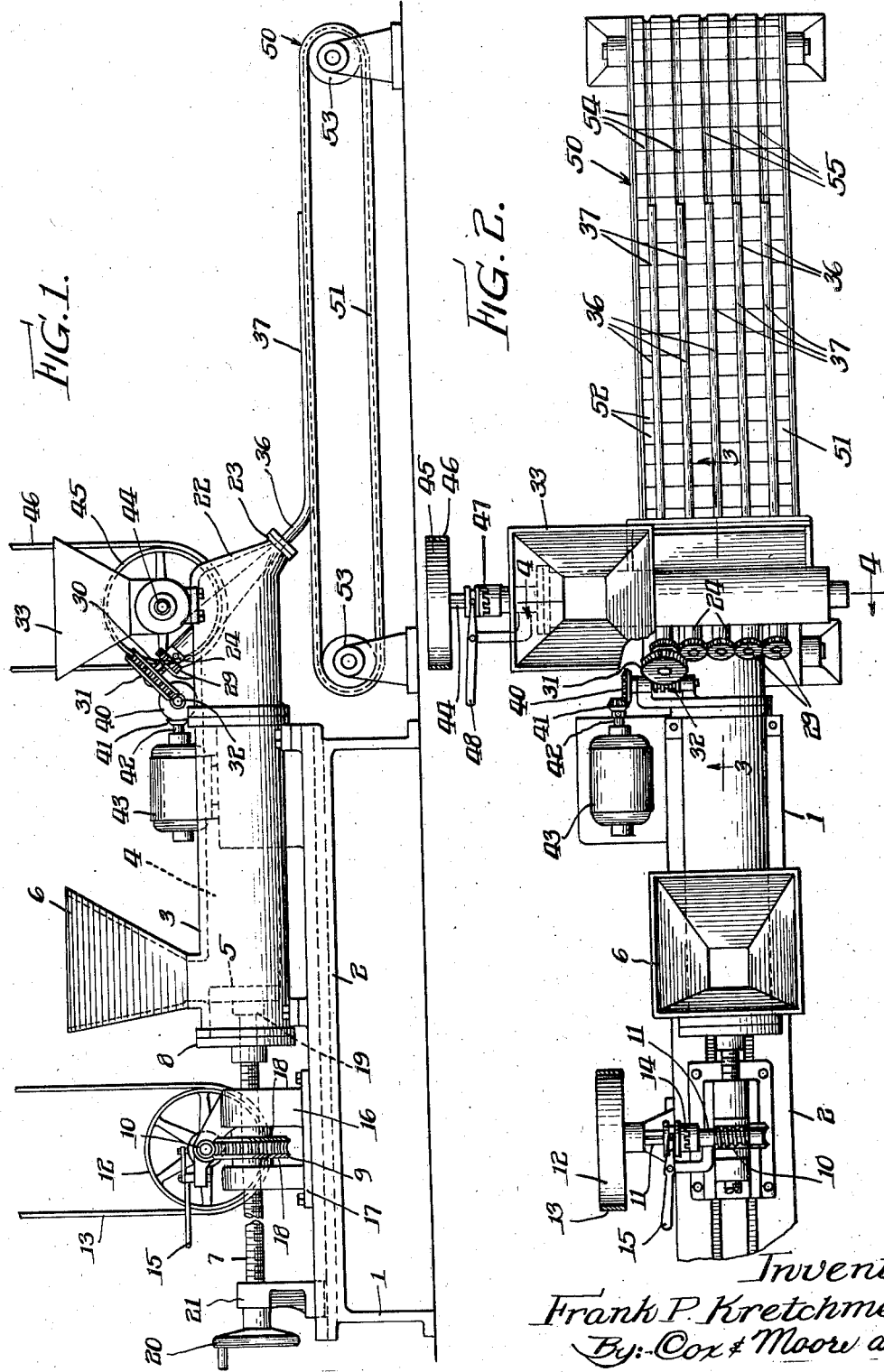
Inventor
Frank P. Kretchmer
By:- Cox & Moore attys.

Aug. 2, 1938.　　F. P. KRETCHMER　　2,125,729
MACHINE FOR MAKING FILLED CONFECTIONS
Filed April 30, 1936　　2 Sheets-Sheet 2
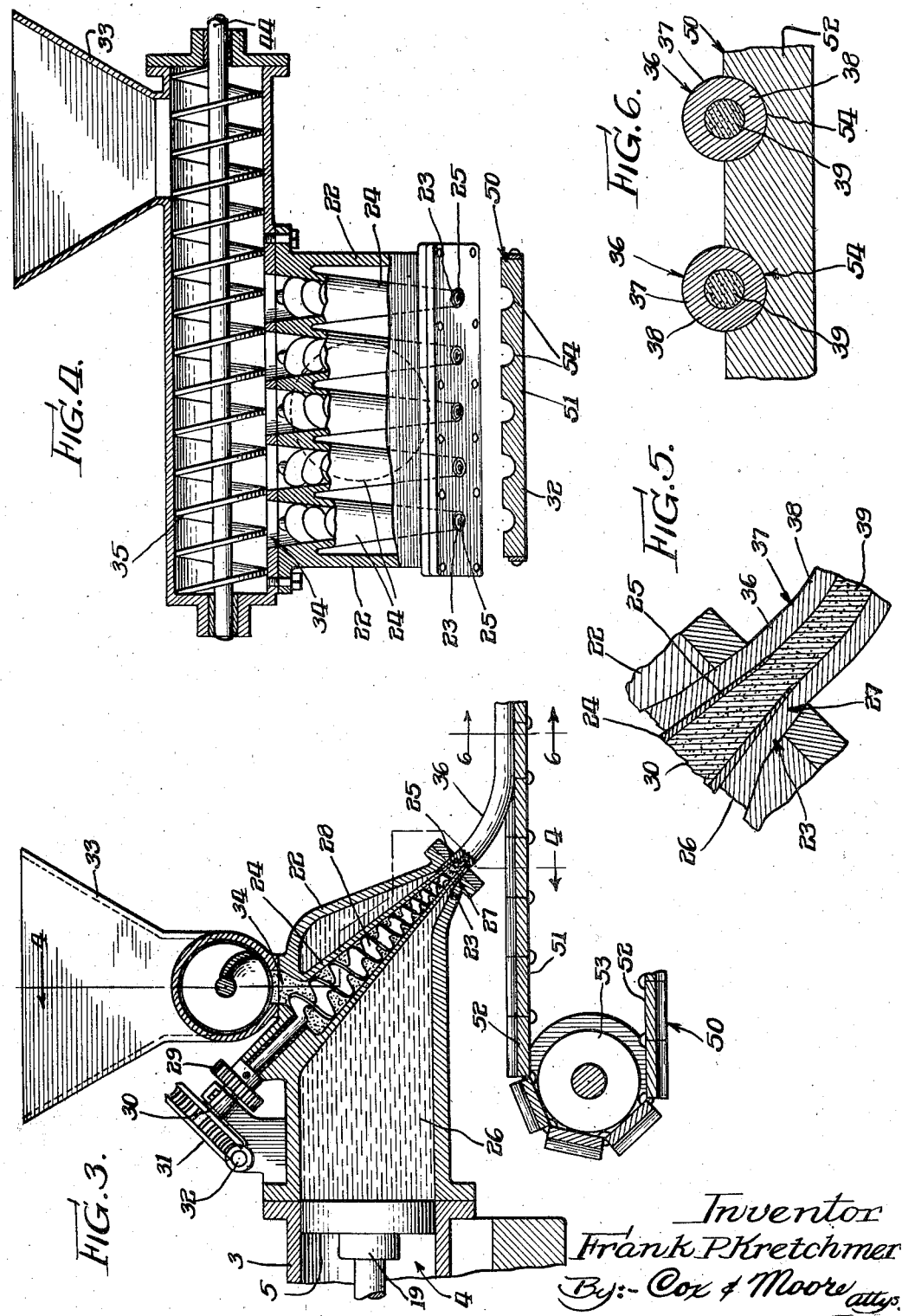
Inventor
Frank P. Kretchmer
By:- Cox & Moore attys.

Patented Aug. 2, 1938

2,125,729

UNITED STATES PATENT OFFICE 2,125,729

MACHINE FOR MAKING FILLED CONFECTIONS

Frank P. Kretchmer, Chicago, Ill.

Application April 30, 1936, Serial No. 77,192

10 Claims. (Cl. 107—1)

This invention relates to machines or apparatus for making confections, and particularly for making filled confections of the type having an exterior coat and an inner filling or core.

The primary object of the present invention is to provide a new and improved positively and efficiently operating machine, which embodies certain characteristics for forcing relatively heavy confection, such as caramel, through a restricted orifice and about a die so as to provide a tube into which there is fed an inner filling of confection of a different kind or consistency.

Another object of the invention is the provision of a candy making machine which comprises a plurality of die members from which relatively heavy substance, such as caramel, is forced about the dies, the dies being filled with a different substance to fill the tubular coating, there being a plurality of the outer cylindrical forming dies and the inner filling members so that a plurality of strips of tubular filled candy may be formed or made by continuous operation of the machine.

Another object of the invention is the provision of unique means for forming a plurality of tubular confectionery members filled with a confection of a different character, the provision of new and novel means for feeding the substance, the provision of certain supporting dies or molds to receive the finished material as it leaves the machine, as well as new and novel transporting or conveying means.

Numerous other objects and advantages will be apparent throughout the progress of the following specification.

The accompanying drawings illustrate a selected embodiment of the invention and the views therein are as follows:

Fig. 1 is a detail elevation of a candy machine and embodying the invention.

Fig. 2 is a detail plan elevation thereof.

Fig. 3 is a detail vertical sectional view on the line 3—3 of Fig. 2.

Fig. 4 is a transverse sectional view on the lines 4—4 of Figs. 2 and 3.

Fig. 5 is a detail sectional view showing the manner in which the confection is discharged or exuded from the nozzle.

Fig. 6 is a detail sectional view on the line 6—6 of Fig. 3 showing the confection arranged in the supporting or receiving molds.

The particular machine herein shown for the purpose of illustration comprises a base 1 including a table or support 2. A cylindrical casing 3 is operatively fastened to the support 1 and has a cylinder chamber 4, Fig. 3, in which a plunger or piston 5 operates. A hopper 6 is operatively connected to the casing 3, Fig. 1, through which material, such as caramel, may be fed into the cylinder chamber 4 to be acted upon by the piston 5, the casing 5 being provided with an opening cooperating with the hopper 6 to permit the entrance of the substance into the cylinder chamber 4. A shaft 7, which may be threaded as indicated in Fig. 1, is operatively connected to the piston 5 and this shaft 7 passes through a cylinder head 8 which is also threaded to threadedly engage the shaft 7. An internally threaded worm-gear 9 is mounted on the shaft 7 and is rotated by a worm 10. The worm 10 is fixed to a shaft 11, Fig. 2, upon which shaft there is mounted a pulley 12. This pulley is operated by a belt 13 which is driven by a driven pulley (not shown). Instead of employing the pulley 12 and the belt 13, any source of power, such as an electric motor (not shown) may be provided for rotating the worm 10. A clutch 14, controlled by a lever 15, may be arranged to cooperate between the shaft 11 and the worm 10 to disconnect the worm from the power if and when desired. The threaded shaft 7 is operatively supported in standards 16 and 17, there being supporting members 18 on each side of the worm-wheel 9 to prevent lateral movement, that is, movement to the right or left as viewed in Fig. 1. Thus, when the worm 10 is rotated, the worm-gear 9 will also rotate, but will be prevented from translating. The rotation of the worm-gear 9 being internally threaded, as previously described, will cause rotative movement of the shaft 7 and consequently translation of the piston head 5. There may be provided a ball and socket or swivel connection between the inner end of the screw shaft 7 and the piston head 5, as indicated at 19, Figs. 1 and 3, to keep the piston head 5 from rotating even when the shaft 7 rotates. An operating handle 20, Fig. 1, may be fixed to the outer end of the shaft 7 and in cooperation with the vertical standard 21 which is threaded to receive the shaft 7, so that the plunger 5 may be operated by hand, that is, upon manual turning of the fly-wheel 20.

The casing 4 terminates in a nozzle 22 having a plurality of separate and distinct discharge nozzles or orifices 23. A plurality of separate nozzles 24 extend through and cooperate with the main caramel nozzle 22, and these nozzles discharge within the orifices 23, there being a space between the end 25 of the separate and independent nozzles 24 and the caramel nozzle discharge orifices 23 so that the caramel substance, designated generally by the numeral 26, Fig. 3, as it is forced into the main nozzle 22, will be forced to flow or spread around the plurality of nozzles 24 and be forced out through the opening 27 surrounding the ends 25 of nozzles 24. Therefore, the caramel material, as it is forced out of the main nozzle 22, will be in the form of a hollow tube.

Each nozzle 24 is tapered, as shown, and carries a screw or worm 28, each of which extends through the end of the main caramel nozzle 22 and carries a pinion 29 at its outer end, Fig. 3. These pinions are adapted to mesh with each other so that the screws 28 will operate uniformly and in unison. At least one of the screws 28 has an extended shaft 30 upon which a gear 31 is mounted. This gear is adapted to be operated by a driven worm 32, Fig. 3. Thus, it can be readily seen that rotation of the worm 22 will cause rotation of each of the screws 28.

A hopper 33 is operatively mounted on the caramel nozzle, but has no communication with the caramel chamber 4. The hopper 33 does, however, have operative communication with each of the nozzles 24, there being openings 34 provided in the bottom of the hopper to afford communication between the hopper and the individual nozzles 24. The hopper 33 is adapted to receive substance, such as a candy confection, like for instance cream filling, and the cream filling in the hopper 33 is translated or moved by a driven worm 35, Fig. 1, so that the respective worms 28 in the screws 28 may be continuously fed with cream filling put in the hopper 33. The cream filling in the hopper 33 is thus forced to eject out of the ends of the nozzles 24 and inasmuch as the caramel is formed in a tube about each discharge end 25 of the nozzles 24, the hollow tube of caramel will be filled with a cream filling. The resultant substance or confection 36 which, therefore, finally exudes from the end of the main nozzle 22 will be in the form of a tube 37 having an outer coating 38 of caramel or other similar substance, and an inner filling of cream or other substance 39, Fig. 6.

The worm 32 may have a beveled gear 40 fixed on the end of its shaft which beveled gear operates with another gear 41 on the shaft 42 of an electric motor 43, and the screw 35, which is rotated by the shaft 44, may have a pulley 45 fastened thereto, Fig. 2. The pulley 45 may be driven by a belt 46 which belt 46 is driven by an electric motor or other prime mover (not shown). A clutch 47 having a clutch handle 48 may be interposed in the shaft 33 to connect or disconnect the shaft 44 with the power element.

A conveyor 50 is arranged adjacent the discharge end of the apparatus to receive the various strips of tubular material 37 as it is discharged from the respective nozzles. This conveyor is adapted to be driven at a speed synchronized with the feed of the material. The conveyor may comprise an endless belt 51 composed of a plurality of adjacent hingedly connected transverse strips 52 passing about rollers 53. The strips, when in horizontal position, are adapted to feed relatively tight together as clearly shown in Fig. 3. Each strip 52 is provided with a plurality of semi-circular grooves 54 which are in alinement with each other so that on the upper face of the conveyor belt continuous relatively long grooves 55 are provided. These grooves are so arranged that the material 36, when it leaves the nozzle, will be in alinement with the grooves and the material will be deposited in the respective grooves. The arrangement of the grooves is to keep the finished product in relatively circular shape, otherwise the material would tend to flatten were not grooves of the present character provided. If desired, cooling means (not shown) may operate in connection with the conveyor belt to properly chill and fix the confection. The strips of filled confection 36 are then removed from the conveyor and cut to the desired length.

The invention provides a simple positively operating efficient machine to produce mechanically or automatically a long strip of candy or other confection having an outer surface of one kind of material or confection with an inner filling of another kind of material or confection. It has been found that the present invention is particularly adapted for making filled caramels, the confection having an outer coating of a predetermined thickness with an inner cream filling. The strips are cut to the desired length whereby filled caramels of proper size are provided.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A machine for making candy confectionery comprising a chamber, a nozzle communicating with the chamber and having a discharge orifice, a forming member arranged in the nozzle, means for feeding substance into the chamber, a piston in the chamber for forcing substance about the forming member and through the orifice whereby a tubular confection is provided, and screw means in the forming member for forcing substance through the forming member, said forming member having a discharge orifice within the area of the first orifice whereby substance within the forming member is forced through said last named orifice and into the hollow tube confection.

2. A machine for making filled confection comprising a nozzle having a plurality of orifices, a plurality of other nozzles mounted on the first nozzle and having the discharge ends thereof arranged concentrically with respect to said orifices, means for forcing substance about all of the second named nozzles and out of the orifices in the first named nozzle whereby tubes of the substance are formed, and means for feeding filling substance through the orifices of said second nozzles and into the said tubes whereby the tubes are filled with the filling substance from the second nozzles.

3. A machine for making filled confectionery comprising a nozzle having a plurality of orifices, a plurality of forming members extending into the said nozzle, said forming members having discharge ends arranged substantially concentrically with respect to the orifices in the nozzle, means for feeding substance through the nozzle and about said forming members and through the orifices in the nozzle, screw means arranged in the forming members, and means for rotating the screw means, means for furnishing filling substance to the screw means whereby filling substance will be forced through the orifices in the forming members and into the substance forced through the orifices in the nozzle.

4. A machine for making filled confection comprising a casing having a cylinder chamber, a hopper communicating with the chamber, a discharge nozzle operatively communicating with the chamber, a piston in said chamber for forcing substance from the hopper into the chamber and through the nozzle, a die in the nozzle about which the substance is forced through the orifice in the nozzle and formed into a hollow member, said die including a nozzle, a worm in said last named nozzle, means for rotating the worm, a hopper containing a filler substance, and means for feeding the filler substance in the hopper to said worms whereby the filler substance is forced through said last named nozzle into the hollow member and fills said hollow member.

5. A machine for making candy confectionary comprising a chamber, a nozzle communicating with the chamber having a tapered discharge orifice, a forming member arranged in the nozzle, means for feeding substance into the chamber, a piston in the chamber for forcing substance about the forming member and through the orifice whereby tubular confection is provided, and frusto-conical screw means in the forming member forcing substance through the forming member, said forming member having a tapered discharge orifice within the area of the first orifice whereby relatively heavy substance within the forming member is forced through said last named orifice and into the hollow tube confection.

6. A machine for making filled confection, comprising a chamber, a nozzle having a plurality of spaced apart discharge orifices in communication with said chamber, a forming member arranged in said nozzle and having spaced apart forming portions extending through said orifices, means for feeding substance into the chamber, a piston in the chamber forcing the substance about the forming portions of said forming member and through said orifices whereby a tubular confection is provided, each of the forming portions of said forming member having a discharge orifice concentric to one of the first mentioned discharge orifices, and means for feeding a second substance through said last named orifices whereby a hollow tube of filled confection is discharged from each of a pair of said concentric orifices.

7. A machine for making filled confection, comprising a chamber, a nozzle having a plurality of spaced apart discharge orifices in communication with said chamber, a forming member arranged in said nozzle and having spaced apart forming portions extending through said orifices, means for feeding a substance into the chamber, a piston in the chamber for forcing the substance about the forming portions of said forming member and through said orifices whereby a tubular confection is provided, each of the forming portions of said forming member having a discharge orifice concentric to one of the first mentioned discharge orifices, a hopper supplying a second substance to said forming member, and means within said forming member for feeding the substance from said hopper through said last mentioned orifices whereby a hollow tube of filled confection is discharged from each of a pair of said cencentric orifices.

8. A machine for making filled confectionary, comprising a chamber, a nozzle communicating with the chamber and having a tapered discharge orifice, a frustoconical forming member arranged in the nozzle, means for feeding substance into the chamber, a piston in the chamber for forcing the substance about said frustoconical forming member and through said tapered discharge orifice whereby a tubular confection is provided, means for forcing a filling substance through said forming member, said forming member having a tapered discharge orifice within the area of the first orifice whereby the filling substance forced through the forming member passes through said last named orifice and into said tubular confection.

9. A machine for making confectionary, comprising a cylindrical chamber having a downwardly tapering end portion, a nozzle communicating with said end portion and having a discharge orifice, a forming member extending laterally of said chamber into said nozzle, means for feeding substance into the cylindrical chamber, a piston in the chamber for forcing substance about the forming member and through said tapered end portion into and through said discharge orifices whereby a hollow tube of confection is provided, means in the forming member for forcing a substance therethrough, said forming member having a discharge orifice within the area of the first orifice whereby a relatively heavy substance within the forming member is forced through said last named orifice and into the hollow tube confection.

10. A machine for making filled confectionary comprising a nozzle having an orifice, a forming member extending into said nozzle, said forming member having a discharge end arranged substantially concentrically with respect to the orifice in the nozzle, means for feeding substance through the nozzle and about said forming member and through the orifice in the nozzle, screw means arranged in the forming member, and means for rotating the screw means, means for furnishing filling substance to the screw means, whereby filling substance will be forced through the orifice in the forming member and into the substance forced through the orifice in the nozzle.

FRANK P. KRETCHMER.